United States Patent
Lee et al.

(10) Patent No.: US 10,128,946 B2
(45) Date of Patent: Nov. 13, 2018

(54) VISIBLE LIGHT COMMUNICATION DEVICE AND DRIVING METHOD THEREOF

(71) Applicant: Industrial Technology Research Institute, Hsinchu (TW)

(72) Inventors: Yu-Chen Lee, New Taipei (TW); Chueh-Hao Yu, Yunlin County (TW); Jyun-Liang Lai, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 15/394,224

(22) Filed: Dec. 29, 2016

(65) Prior Publication Data
US 2018/0048388 A1     Feb. 15, 2018

(30) Foreign Application Priority Data
Aug. 9, 2016 (TW) .............................. 105125253 A

(51) Int. Cl.
H04B 10/00 (2013.01)
H04B 10/116 (2013.01)
H04B 10/50 (2013.01)

(52) U.S. Cl.
CPC ......... *H04B 10/116* (2013.01); *H04B 10/502* (2013.01)

(58) Field of Classification Search
CPC ..................... H04B 10/116; H04B 10/502
(Continued)

(56) References Cited

U.S. PATENT DOCUMENTS 7,689,130 B2   3/2010   Ashdown
7,759,881 B1   7/2010   Melanson
(Continued)

FOREIGN PATENT DOCUMENTS

EP    2547173    12/2015
TW   201338444   9/2013
(Continued)

OTHER PUBLICATIONS

Taiwan Patent Office, Office Action, Patent Application Serial No. 105125253, dated May 25, 2017, Taiwan.
(Continued)

*Primary Examiner* — M. R. Sedighian

(57) ABSTRACT

A visible light communication device includes a light-emitting unit, a switch-mode light-emitting diode (LED) driver, a synthesizing circuit, and a path selection circuit. The switch-mode LED driver provides a driving current for driving the light-emitting unit. The synthesizing circuit synthesizes a data signal and a dimming signal to form a synthesized signal. According to a data frequency and a dimming ratio obtained from one or more path selection information, the path selection circuit selects to turn on a bypass current modulation unit to inject the synthesized signal to the bypass current modulation unit along one path and the bypass current modulation unit controls the light-emitting unit according to the synthesized signal, or selects to inject the synthesized signal to the switch-mode LED driver along another path and the switch-mode LED driver controls the light-emitting unit according to the synthesized signal.

15 Claims, 11 Drawing Sheets

(58) Field of Classification Search
USPC .......................................................... 398/118
See application file for complete search history.

(56) References Cited

U.S. PATENT DOCUMENTS

| | | | |
|---|---|---|---|
| 8,150,269 | B2 | 4/2012 | Sauerlander et al. |
| 8,427,300 | B2 | 4/2013 | Covaro et al. |
| 8,630,549 | B2 | 1/2014 | Kim et al. |
| 8,810,155 | B2 | 8/2014 | Kamada et al. |
| 9,088,361 | B2 | 7/2015 | Castor et al. |
| 2006/0239689 | A1 | 10/2006 | Ashdown |
| 2011/0222849 | A1 | 9/2011 | Han et al. |
| 2013/0015784 | A1 | 1/2013 | Kamada et al. |
| 2013/0015785 | A1 | 1/2013 | Kamada et al. |
| 2014/0286645 | A1 | 9/2014 | Kido et al. |
| 2014/0321860 | A1 | 10/2014 | Kido et al. |
| 2015/0257230 | A1 | 9/2015 | Lee et al. |
| 2016/0028478 | A1* | 1/2016 | Rietman ............ H04B 10/5563 398/118 |

FOREIGN PATENT DOCUMENTS

| | | |
|---|---|---|
| TW | 201340630 | 10/2013 |
| TW | 201424284 | 6/2014 |
| TW | 201526558 | 7/2015 |

OTHER PUBLICATIONS

Modepalli, Kumar, "Dual-Purpose Offline LED Driver for Illumination and Visible Light Communication," IEEE Transactions on Industry Applications, Jan. 2015, pp. 406-419, vol. 51, No. 1, IEEE, US.

"1.5MHz, 30A High-Efficiency, LED Driver with Rapid LED Current Pulsing," Max 16816, May 2015, pp. 1-25, Maxim Integrated, US.

Hoa Le Minh, "100-Mb/s NRZ Visible Light Communications Using a Postequalized White LED," IEEE Photonics Technology Letters, Aug. 2009, pp. 1063-1065, vol. 21, No. 15, IEEE, US.

Hoa Le Minh, "80 Mbit/s Visible Light Communications using pre-equalized white LED," ECOC 2008, Sep. 2008, pp. 223-224, vol. 5, IEEE, US.

Hoa Le Minh, "High-Speed Visible Light Communications Using Multiple-Resonant Equalization," IEEE Photonics Technology Letters, Jul. 2008, pp. 1243-1245, vol. 20, No. 14, IEEE, US.

Xiong Deng et al., "Performance Comparison for Illumination and Visible Light Communication System Using Buck Converters," Globecom 2014 Workshop Optical Wireless Communications, 2014, pp. 547-552, IEEE, US.

"TPS92640/TPS92641 Synchronous Buck Controllers for Precision Dimming LED Drivers," Nov. 2015, 35 pages, Texas Instruments, US.

* cited by examiner

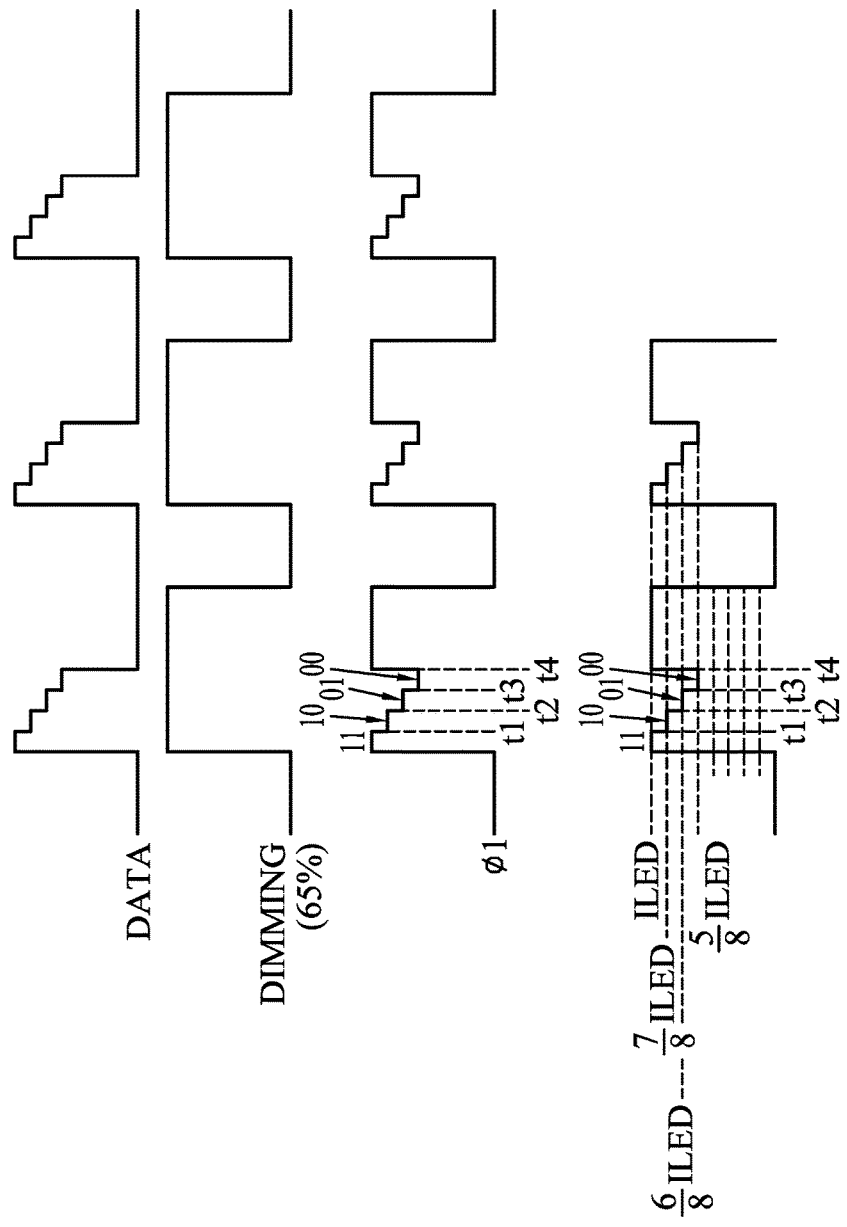

| The one or more path selection information is the synthesized signal, and the data frequency and the dimming ratio are obtained from the synthesized signal | ~S1_a1 |

| Calculating the data frequency and the dimming ratio from the synthesized signal, and generating an output signal having a first state when the data frequency is greater than a critical frequency or the data frequency is lower than or equal to the critical frequency and the dimming ratio is not between an interval or generating the output signal having a second state when the data frequency is lower than or equal to the critical frequency and the dimming ratio is between the interval; and turning on the bypass current modulation unit to inject the synthesized signal to the bypass current modulation unit along path p1 according to the output signal having the first state or injecting the synthesized signal to the switch-mode LED driver along path p2 according to the output signal having the second state | ~S1_a2 |

FIG. 6

US 10,128,946 B2

VISIBLE LIGHT COMMUNICATION DEVICE AND DRIVING METHOD THEREOF

CROSS-REFERENCE TO RELATED APPLICATION

The present application is based on, and claims priority from, Taiwan Application Serial Number TW 105125253, filed Aug. 9, 2016, the disclosure of which is hereby incorporated by reference herein in its entirety.

TECHNICAL FIELD

The technical field relates to a visible light communication device and a driving method thereof.

BACKGROUND

The visible light communication is a wireless communication technology; by taking advantage of the broad modulation bandwidth of light-emitting diode (LED), the visible light communication technology is promising to transmit data at high-speed and also has the illumination function. The visible light communication is also a developing local area network (LAN) technology, which is capable of data transmission within the illumination coverage. By implementing receiving devices in the illumination coverage of LED devices of visible light communication, users can achieve the purpose of data transmission using LED light source, and which can be integrated with the wireless communication technology such as WIFI (it stands for interoperability and the ability to simply and easily connect) for mitigating a congested band of radio frequency (RF).

The main development direction of visible light communication technology is to improve the transmission rate. The LED driver is usually implemented by a Bias-T architecture which integrates direct current (DC) and alternating current (AC) signals. However, this architecture significantly reduces the degree of integration and also needs one or more power amplifiers to inject AC signal, thereby increasing system cost, and reducing energy conversion efficiency significantly. Since the energy conversion efficiency is an important energy-saving index in lighting applications, the international lighting manufacturers recently introduce high efficiency switch mode LED drivers to visible light communication, which are widely used for LED lighting. However, the data transmission rate is significantly limited by the operating frequency of the switch-mode LED driver (typically about 100 kHz) and large energy storage elements, such that the data transmission rate is usually less than 10 kbps, or even less than 1 kbps and therefore cannot achieve the purpose of high-speed data transmission.

SUMMARY

An exemplary embodiment provides a visible light communication device including a light-emitting unit, a switch-mode light-emitting diode (LED) driver, a synthesizing circuit, and a path selection circuit. The switch-mode LED driver provides a driving current for driving the light-emitting unit. The synthesizing circuit synthesizes a data signal and a dimming signal to form a synthesized signal. According to a data frequency and a dimming ratio obtained from one or more path selection information, the path selection circuit selects to turn on a bypass current modulation unit to inject the synthesized signal to the bypass current modulation unit along one path and the bypass current modulation unit controls the light-emitting unit for displaying the data signal according to the synthesized signal, or selects to inject the synthesized signal to the switch-mode LED driver along another path and the switch-mode LED driver controls the light-emitting unit according to the synthesized signal for displaying the data signal.

Another exemplary embodiment provides a driving method for driving a visible light communication device, including: synthesizing a data signal and a dimming signal in the visible light communication device to form a synthesized signal; and selecting to inject the synthesized signal along one path to a bypass current modulation unit or along another path to a switch-mode LED driver of the visible light communication device according to a data frequency and a dimming ratio obtained from one or more path selection information, wherein the bypass current modulation unit or the switch-mode LED driver controls a light-emitting unit of the visible light communication device according to the synthesized signal for displaying the data signal.

The foregoing will become better understood from a careful reading of a detailed description provided herein below with appropriate reference to the accompanying drawings.

BRIEF DESCRIPTION OF THE DRAWINGS

FIG. 3B is a schematic diagram showing that the multi-level current amplitude modulation circuit of FIG. 3A controls the switches according to the synthesized signal for displaying the data signal.

FIG. 6 is a flow chart showing a driving method according to the exemplary embodiment disclosed in FIG. 1A.

DETAILED DESCRIPTION OF DISCLOSED EMBODIMENTS

Figure 1A:
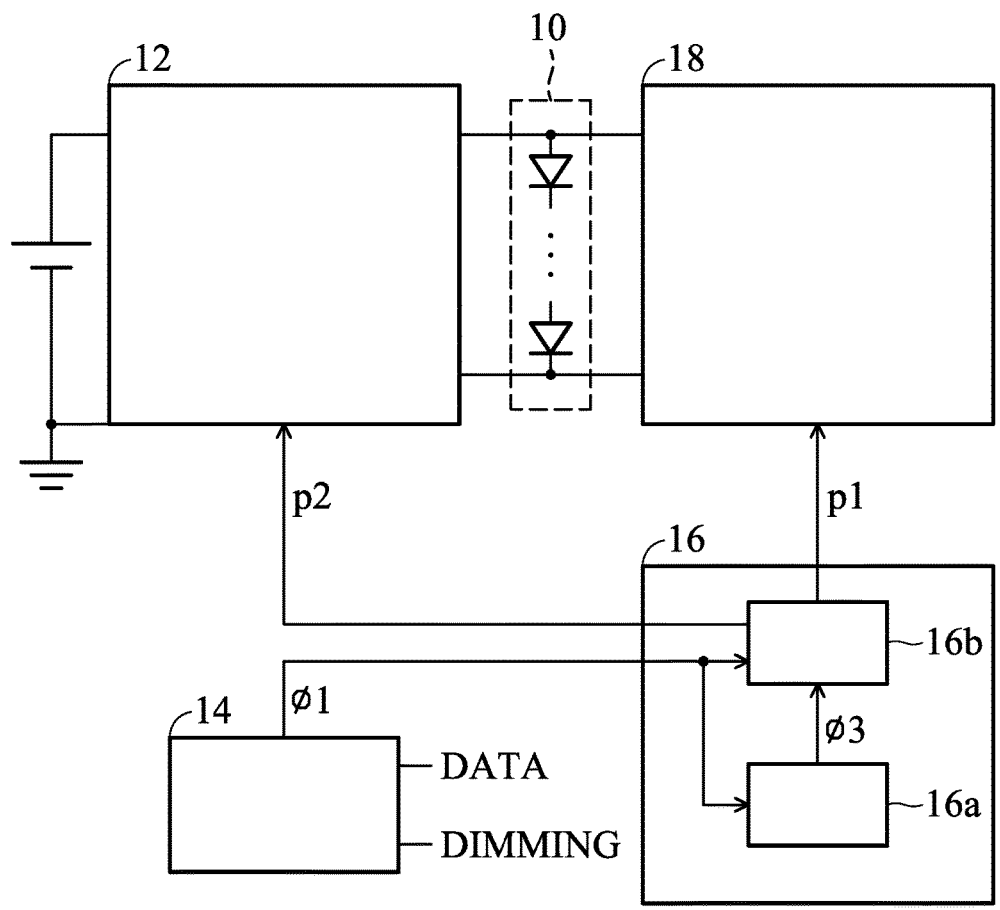
FIG. 1A shows a schematic diagram of a visible light communication device according to an exemplary embodiment of the application, in which the data frequency and the dimming ratio are obtained from the synthesized signal.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1A shows a schematic diagram of a visible light communication device according to an exemplary embodiment of the application. The visible light communication device includes a light-emitting unit 10, a switch-mode light-emitting diode (LED) driver 12, a synthesizing circuit 14, a path selection circuit 16 and a bypass current modulation unit 18.

The light-emitting unit 10 includes a plurality of visible LEDs which are electrically connected to each other in series. The switch-mode light LED driver 12 generates a pulse width modulation (PWM) signal for providing a driving current for driving the light-emitting unit 10. The synthesizing circuit 14 synthesizes a data signal DATA and a dimming signal DIMMING to form a synthesized signal $\phi 1$.

According to a data frequency and a dimming ratio obtained from one or more path selection information, the path selection circuit 16 selects to turn on a bypass current modulation unit 18 to inject the synthesized signal $\phi 1$ to the bypass current modulation unit 18 along one path p1 and the bypass current modulation unit 18 controls the light-emitting unit 10 for displaying the data signal DATA according to the synthesized signal $\phi 1$, or selects to inject the synthesized signal $\phi 1$ to the switch-mode LED driver 12 along another path p2 and the switch-mode LED driver 12 controls the light-emitting unit 10 according to the synthesized signal $\phi 1$ for displaying the data signal.

In the embodiment disclosed in FIG. 1A, the one or more path selection information is the synthesized signal $\phi 1$, and the data frequency fdata and the dimming ratio Ddimming are obtained from the synthesized signal.

Figure 1B:
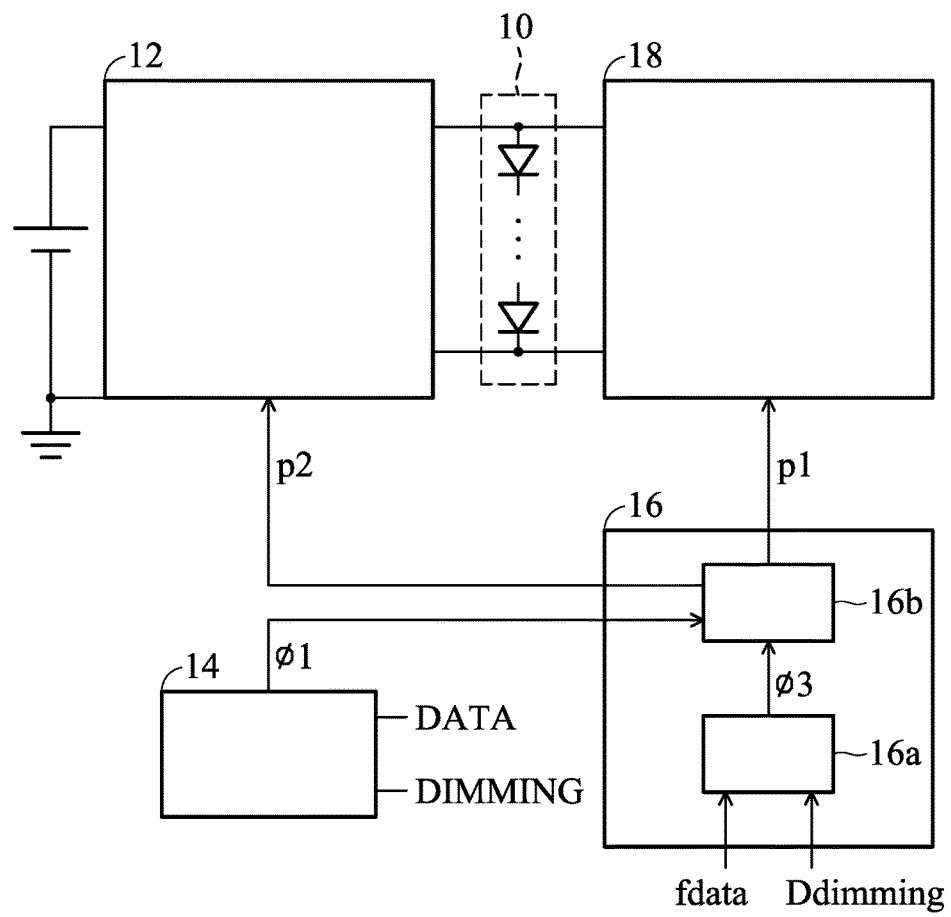
FIG. 1B shows a schematic diagram of a visible light communication device according to another exemplary embodiment of the application, in which the data frequency is obtained from the data signal and the dimming ratio is obtained from the dimming signal.

FIG. 1B shows a schematic diagram of a visible light communication device according to another exemplary embodiment of the application. In the embodiment disclosed in FIG. 1B, the one or more path selection information are the data frequency fdata and the dimming ratio Ddimming received by the path selection circuit 16, and the data frequency fdata is obtained from the data signal DATA and the dimming ratio Ddimming is obtained from the dimming signal DIMMING.

In the embodiment disclosed in FIG. 1A, the path selection circuit 16 includes a decision circuit 16a and a driving circuit 16b. In this embodiment, the decision circuit 16a receives the synthesized signal $\phi 1$, calculates the data frequency fdata and the dimming ratio Ddimming from the synthesized signal $\phi 1$, and generates an output signal $\phi 3$ having a first state when the data frequency fdata is greater than a critical frequency or the data frequency fdata is lower than or equal to the critical frequency and the dimming ratio Ddimming is not in an interval between two different percentages, or generates the output signal $\phi 3$ having a second state when the data frequency fdata is lower than or equal to the critical frequency and the dimming ratio Ddimming is in the interval between the two different percentages. For example, the decision circuit 16a generates an output signal $\phi 3$ having a high state when the data frequency fdata is greater than 20 KHz or the data frequency fdata is lower than or equal to 20 KHz and the dimming ratio Ddimming is not between 10%-50%, or generates the output signal $\phi 3$ having a low state when the data frequency fdata is lower than or equal to 20 KHz and the dimming ratio Ddimming is between 10%-50%.

The driving circuit 16b receives the output signal 3 and the synthesized signal $\phi 1$, and turns on the bypass current modulation unit 18 to inject the synthesized signal $\phi 1$ to the bypass current modulation unit 18 according to the output signal $\phi 3$ having the first state, or turns off the bypass current modulation unit 18 to inject the synthesized signal $\phi 1$ to the switch-mode LED driver 12 according to the output signal $\phi 3$ having the second state.

FIG. 2A is a schematic diagram showing that a decision circuit calculates the data frequency and the dimming ratio from the synthesized signal according to an exemplary embodiment of the application. In the embodiment, the decision circuit 16a shown in FIG. 1A is a counter, and the counter receives at least one synthesized signal $\phi 1$ in a time period, and counts a number x of at least one the synthesized signal $\phi 1$ being in a high state (for example, ten 1 s, in which the symbol 1 denotes a received synthesized signal $\phi 1$ being in the high state) and a number y of the at least one synthesized signal $\phi 1$ being in a low state (for example, ninety 0 s, in which the symbol 0 denotes a received synthesized signal $\phi 1$ being in the low state). The counter obtains the data frequency fdata according to a predefined clock frequency fclk and the number x of the at least one synthesized signal being in the high state, for example, fdata=(1/x)fclk. The counter obtains the dimming ratio Ddimming according to the predefined clock frequency, the number x of the at least one synthesized signal being in the high state and the number y of the at least one synthesized signal being in the low state, for example, Dmimming=(x/x+y)*100%.

FIG. 2B is a schematic diagram showing that the decision circuit calculates the data frequency and the dimming ratio from the at least one synthesized signal according to another exemplary embodiment of the application. In the embodiment, the decision circuit 16a shown in FIG. 1A is a charge pump circuit, and the charge pump circuit receives the at least one synthesized signal $\phi 1$ and generates a comparison signal Vcompare. The charge pump circuit obtains the data frequency fdata according to a time T1 that the comparison signal being in a high state, for example, fdata=1/T1. The charge pump circuit obtains the dimming ratio Ddimming according to the time T1 and a time period of the comparison signal Tcompare, for example, Ddimming=T1/Tcompare*100%.

In the embodiment disclosed in FIG. 1B, the path selection circuit 16 also includes the decision circuit 16a and the driving circuit 16b. As shown in FIG. 1B, the decision circuit 16a receives the data frequency fdata and the dimming ratio Ddimming. By processing a first signal (not shown) having information of the data frequency fdata and a second signal (not shown) having information of the dimming ratio with an external circuit (not shown), the decision circuit 16a obtains the data frequency fdata and the dimming ratio Ddimming, respectively. The decision circuit 16a generates an output signal $\phi 3$ having a first state when the data frequency fdata is greater than a critical frequency or the data frequency fdata is lower than or equal to the critical frequency and the dimming ratio Ddimming is not in the interval between the two different percentages or generates the output signal ϕ3 having a second state when the data frequency fdata is lower than or equal to the critical frequency and the dimming ratio Ddimming is in the interval between the two different percentages.

The driving circuit 16b receives the output signal ϕ3 and the synthesized signal ϕ1, and turns on the bypass current modulation unit 18 to inject the synthesized signal ϕ1 to the bypass current modulation unit 18 according to the output signal ϕ3 having the first state or turns off the bypass current modulation unit 18 to inject the synthesized signal ϕ1 to the switch-mode LED driver 12 according to the output signal ϕ3 having the second state.

Figure 3A:
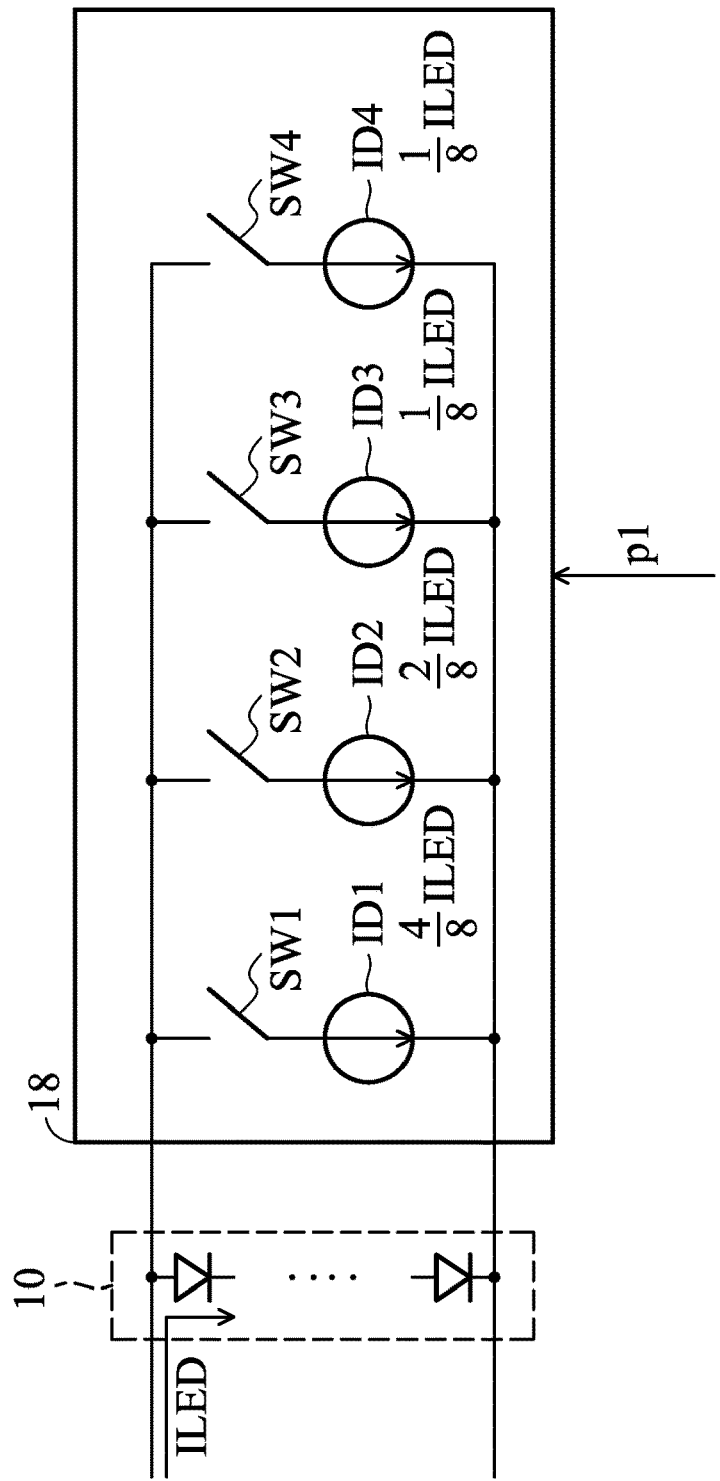
FIG. 3A is a schematic diagram showing that a bypass current modulation unit controls a light-emitting unit according to the synthesized signal for displaying the data signal according to an exemplary embodiment of the application, in which the bypass current modulation unit is implemented by a multi-level current amplitude modulation circuit.

FIG. 3A is a schematic diagram showing that a bypass current modulation unit controls a light-emitting unit according to the synthesized signal for displaying the data signal according to an exemplary embodiment of the application. In the embodiment, the bypass current modulation unit 18 is implemented by a multi-level current amplitude modulation circuit, and the multi-level current amplitude modulation circuit includes at least one combination of a group consisting of a plurality of switches such as SW1-SW4 and a plurality of constant current sources such as ID1-ID4, and the multi-level current amplitude modulation circuit controls the plurality of switches ID1, ID2, ID3, and/or ID4 according to the synthesized signal ϕ1 for displaying the data signal DATA. For example, the synthesized signal ϕ1 is a synthesis of the data signal DATA and the dimming signal DIMMING (Ddimming=65%), as shown in FIG. 3B. In the embodiment, the constant currents passing through the constant current sources ID1, ID2, ID3 and ID4 are 4/8 ILED, 2/8 ILED, 1/8 ILED and 1/8 ILED, respectively. At time t1, the multi-level current amplitude modulation circuit turns off the switches SW1-SW4 according to a digital code 11 of the synthesized signal ϕ1, meanwhile, the current passing through the light-emitting unit 10 is ILED, and hence a digital code 11 of the data signal DATA is displayed. At time t2, the multi-level current amplitude modulation circuit turns on the switch SW3 (or SW4) according to a digital code 10 of the synthesized signal ϕ1, meanwhile, the current passing through the light-emitting unit 10 is 7/8 ILED, and hence a digital code 10 of the data signal DATA is displayed. At time t3, the multi-level current amplitude modulation circuit turns on the switches SW3 and SW4 according to a digital code 01 of the synthesized signal ϕ1, meanwhile, the current passing through the light-emitting unit 10 is 6/8 ILED, and hence a digital code 01 of the data signal DATA is displayed. At time t4, the multi-level current amplitude modulation circuit turns on the switches SW2 and SW3 according to a digital code 00 of the synthesized signal ϕ1, meanwhile, the current passing through the light-emitting unit 10 is 5/8 ILED, and hence a digital code 00 of the data signal DATA is displayed.

Figure 3C:
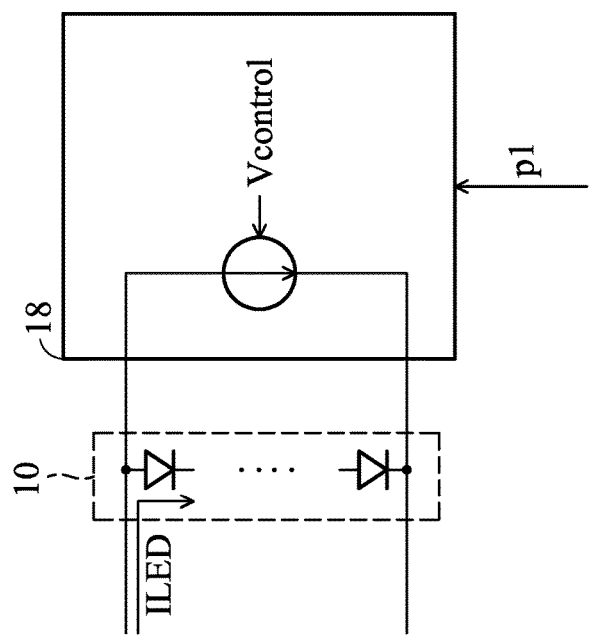
FIG. 3C is a schematic diagram showing that a bypass current modulation unit controls the light-emitting unit according to the synthesized signal for displaying the data signal according to an exemplary embodiment of the application, in which the bypass current modulation unit is implemented by a voltage controlled current source (VCCS).

FIG. 3C is a schematic diagram showing that a bypass current modulation unit controls the light-emitting unit according to the synthesized signal for displaying the data signal according to an exemplary embodiment of the application. In the embodiment, the bypass current modulation unit includes a voltage controlled current source (VCCS). The bypass current modulation unit generates a controlling voltage of the VCCS according to the synthesized signal ϕ1 and controls a current passing through the VCCS by the controlling voltage for displaying the data signal DATA.

Figure 4A:
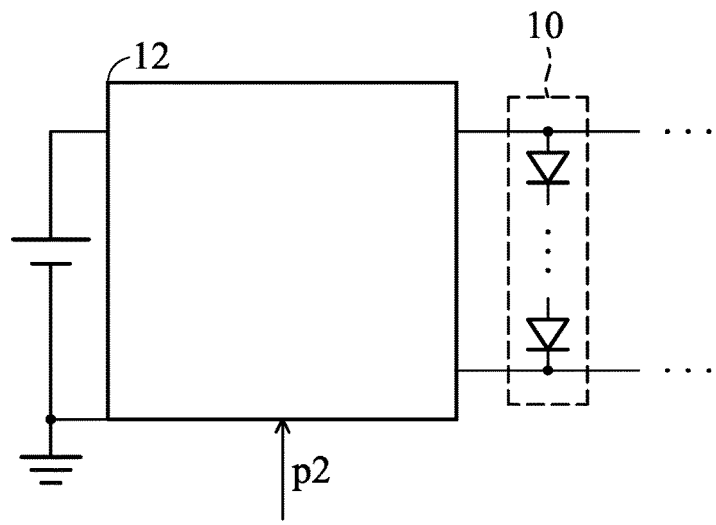
FIG. 4A and FIG. 4B are schematic diagrams showing that a switch-mode light-emitting diode (LED) driver controls the light-emitting unit according to the synthesized signal for displaying the data signal according to an exemplary embodiment of the application.
Figure 4B:
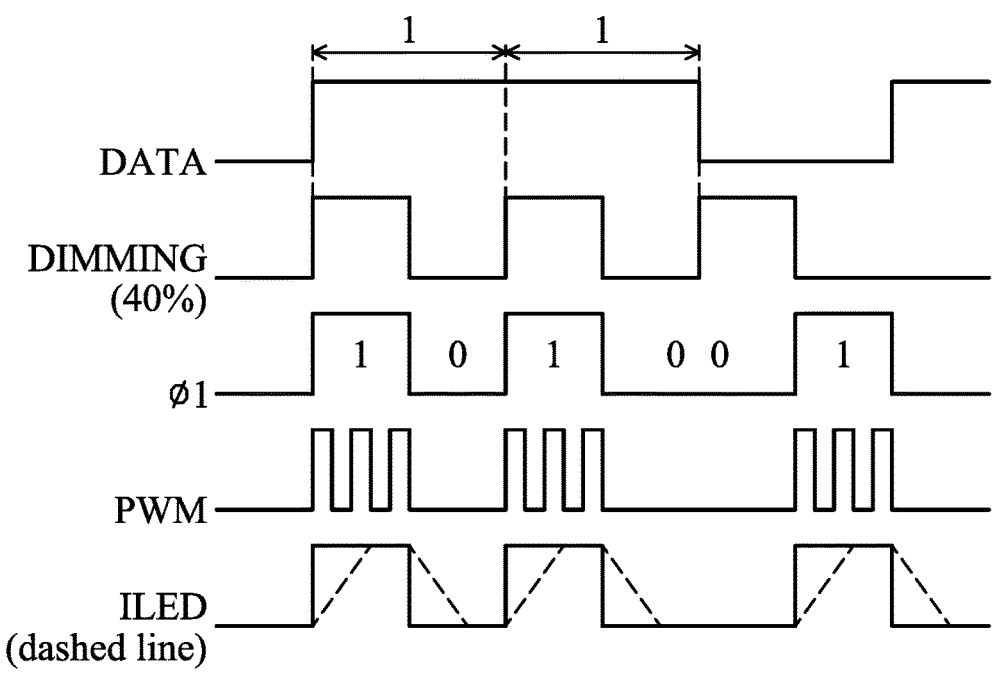

FIG. 4A is a schematic diagram showing that a switch-mode light-emitting diode (LED) driver controls the light-emitting unit according to the synthesized signal for displaying the data signal according to an exemplary embodiment of the application. As described above, the path selection circuit 16 selects to inject the synthesized signal ϕ1 to the switch-mode LED driver 12 along path p2 and the switch-mode LED driver 12 controls the light-emitting unit 10 according to the synthesized signal ϕ1 for displaying the data signal DATA. The switch-mode LED driver 12 generates a pulse width modulation (PWM) signal having a modulated duty cycle according to the synthesized signal ϕ1 for displaying the data signal DATA.

Figure 5:
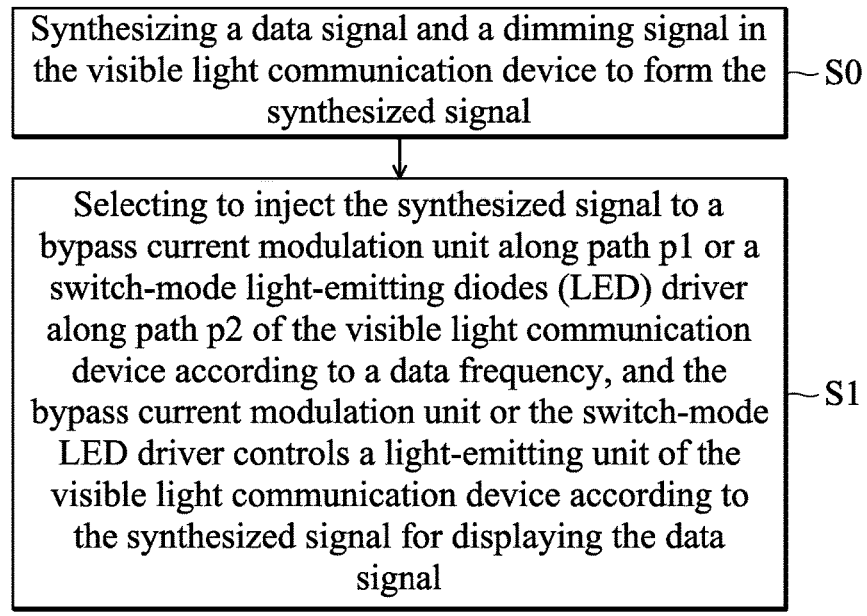
FIG. 5 is a flow chart showing a driving method for driving the visible light communication device according to an exemplary embodiment of the application.

FIG. 5 is a flow chart showing a driving method for driving the visible light communication device according to an exemplary embodiment of the application. In step S0, a data signal and a dimming signal are synthesized to form the synthesized signal. In step S1, which selecting to inject the synthesized signal along one path to a bypass current modulation unit or along another path to a switch-mode light-emitting diodes (LED) driver of the visible light communication device, according to a data frequency and a dimming ratio obtained from one or more path selection information, wherein the bypass current modulation unit or the switch-mode LED driver controls a light-emitting unit of the visible light communication device according to the synthesized signal for displaying the data signal.

FIG. 6 is a flow chart showing a driving method according to the exemplary embodiment disclosed in FIG. 1A. In step S1_a1, the one or more path selection information is the synthesized signal, and the data frequency and the dimming ratio are obtained from the synthesized signal. In step S1_a2, the data frequency and the dimming ratio are calculated from the synthesized signal, and an output signal having a first state is generated when the data frequency is greater than a critical frequency or the data frequency is lower than or equal to the critical frequency and the dimming ratio is not in an interval between two different percentages, or the output signal having a second state is generated when the data frequency is lower than or equal to the critical frequency and the dimming ratio is in an interval between two different percentages. And then, the bypass current modulation unit is turned on to inject the synthesized signal to the bypass current modulation unit along path p1 according to the output signal having the first state or the synthesized signal is injected to the switch-mode LED driver according along path p2 to the output signal having the second state.

Figure 2:
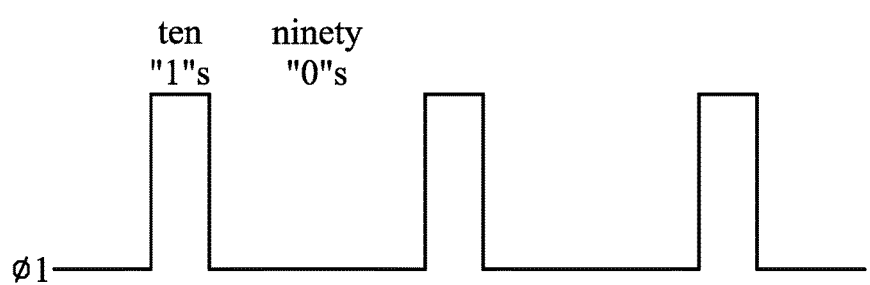
FIG. 2 is a schematic diagram showing that a decision circuit calculates the data frequency and the dimming ratio from the synthesized signal according to an exemplary embodiment of the application.

Referring to the embodiment in FIG. 2, in step S1_a2, the step of calculating the data frequency and the dimming ratio from the synthesized signal includes counting a number of at least one synthesized signal being in the high states and a number of the at least one synthesized signal being in the low states in a time period, and obtaining the data frequency according to a predefined clock frequency and the number of the at least one synthesized signal being in the high states and obtaining the dimming ratio according to the predefined clock frequency, the number of the at least one synthesized signal being in the high states and the number of the at least one synthesized signal being in the low states.

Figure 7:
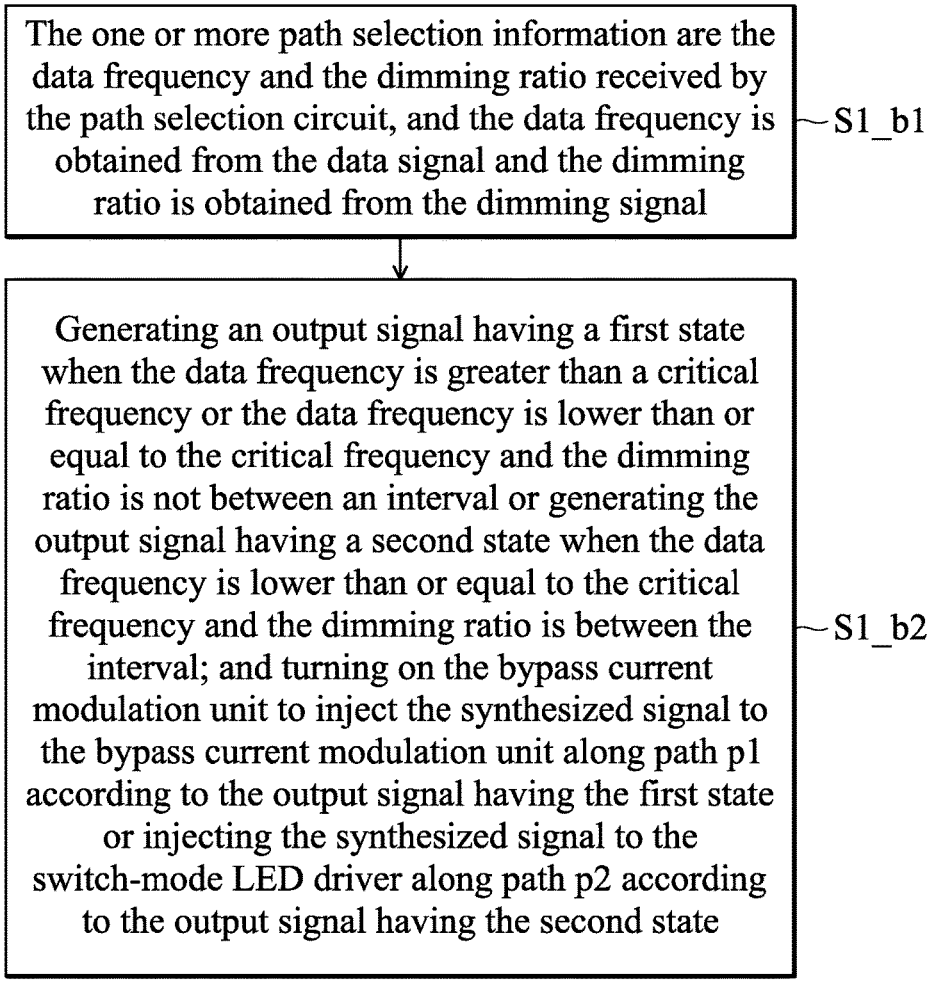
FIG. 7 is a flow chart showing a driving method according to the exemplary embodiment disclosed in FIG. 1B.

FIG. 7 is a flow chart showing a driving method according to the exemplary embodiment disclosed in FIG. 1B. In step S1_b1, the one or more path selection information is the data frequency and the dimming ratio received by the path selection circuit, and the data frequency is obtained from the data signal and the dimming ratio is obtained from the dimming signal.

In step S1_b2, an output signal having a first state is generated when the data frequency is greater than a critical frequency or the data frequency is lower than or equal to the critical frequency and the dimming ratio is not in the interval between two different percentages or the output signal having a second state is generated when the data frequency is lower than or equal to the critical frequency and the dimming ratio is in the interval between the two different percentages; and the bypass current modulation unit is turned on to inject the synthesized signal to the bypass current modulation unit along path p1 according to the output signal having the first state, or the synthesized signal is injected to the switch-mode LED driver along path p2 according to the output signal having the second state.

Figure 8:
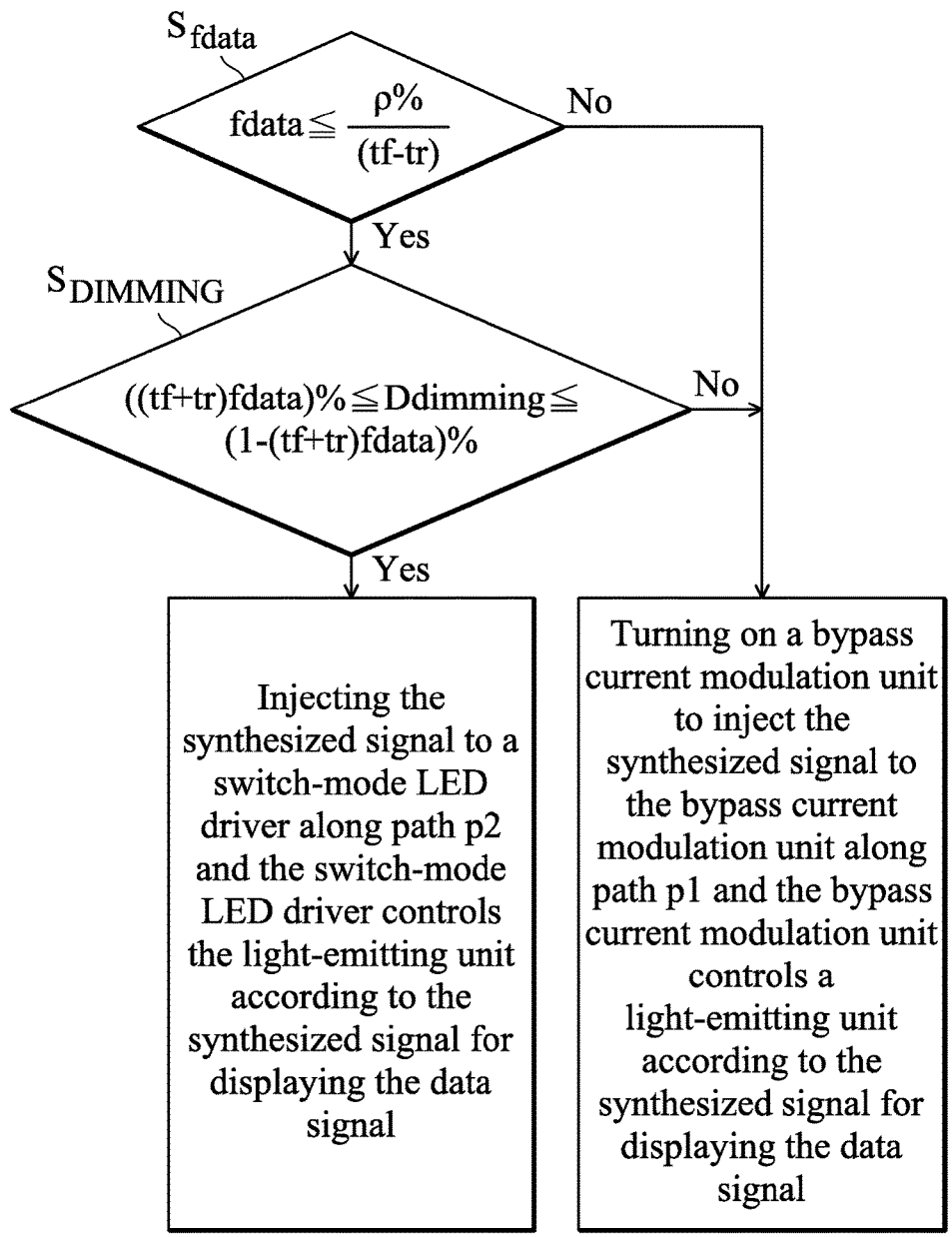
FIG. 8 is a flow chart showing a driving method for driving the visible light communication device according to an exemplary embodiment of the application.

FIG. 8 is a flow chart showing a driving method for driving the visible light communication device according to an exemplary embodiment of the application. First, a data frequency determining step $S_{fdata}$ is performed, in the data frequency determining step $S_{fdata}$, whether the data frequency is lower than or equal to a critical frequency ρ%/(tf−tr) or not is determined. If the data frequency is not lower than and not equal to the critical frequency, a bypass current modulation unit is turned on to inject the synthesized signal to the bypass current modulation unit and the bypass current modulation unit controls a light-emitting unit according to the synthesized signal for displaying the data signal. If yes, a dimming ratio determining step $S_{DIMMING}$ is further performed. In the dimming ratio determining step $S_{DIMMING}$, whether the dimming ratio is in an interval between two different percentages, that is [((tf+tr)fdata)%, (1−(tf+tr)fdata)%], or not is determined. If the dimming ratio is not in the interval between the two different percentages, a bypass current modulation unit is turned on to inject the synthesized signal to the bypass current modulation unit along path p1 and the bypass current modulation unit controls the light-emitting unit according to the synthesized signal for displaying the data signal. If yes, the synthesized signal is injected to a switch-mode LED driver along path p2 and the switch-mode LED driver controls the light-emitting unit according to the synthesized signal for displaying the data signal.

Symbol ρ% represents current accuracy of light-emitting diodes of the light emitting unit 10, tf represents a time that the current of light-emitting diodes is discharged from a high state to a low state time and tr represents a time that the current of light-emitting diodes is charged from a low to a high state.

The switch-mode LED driver 12 is more power-saving, but it cannot be operated for high-speed information transmission. The bypass current modulation unit 18 is able to transmit data at high-speed, but it is more power consumption. By determining whether the data frequency exceeds a critical frequency or not, and/or determining whether the dimming ratio is in an interval between two different percentages or not, the disclosed visible light communication device and the driving method thereof according to embodiments of the invention have advantages of the switch-mode LED driver and the bypass current modulation unit.

It is intended that the specification and examples be considered as exemplary embodiments only, with a true scope of the application being indicated by the following claims and their equivalents.

What is claimed is:

1. A visible light communication device, comprising:
    a light-emitting unit;
    a switch-mode light-emitting diode (LED) driver, providing a driving current for driving the light-emitting unit;
    a synthesizing circuit, synthesizing a data signal and a dimming signal to form a synthesized signal; and
    a path selection circuit, according to a data frequency and a dimming ratio obtained from one or more path selection information, selecting to turn on a bypass current modulation unit to inject the synthesized signal to the bypass current modulation unit along one path, wherein the bypass current modulation unit controls the light-emitting unit for displaying the data signal according to the synthesized signal, or selecting to inject the synthesized signal to the switch-mode LED driver along another path, wherein the switch-mode LED driver controls the light-emitting unit according to the synthesized signal for displaying the data signal,
    wherein the bypass current modulation unit includes a voltage-controlled current source (VCCS), generates a controlling voltage of the VCCS according to the synthesized signal, and controls a current passing through the VCCS by the controlling voltage for displaying the data signal.

2. The visible light communication device of claim 1, wherein the one or more path selection information is the synthesized signal, and the data frequency and the dimming ratio are obtained from the synthesized signal.

3. The visible light communication device of claim 2, wherein the path selection circuit comprises:
    a decision circuit, receiving the synthesized signal, calculating the data frequency and the dimming ratio from the synthesized signal, and generating an output signal having a first state when the data frequency is greater than a critical frequency or the data frequency is lower than or equal to the critical frequency and the dimming ratio is not in an interval between two different percentages or generating the output signal having a second state when the data frequency is lower than or equal to the critical frequency and the dimming ratio is in the interval between the two different percentages; and
    a driving circuit, receiving the output signal and the synthesized signal, and turning on the bypass current modulation unit to inject the synthesized signal to the bypass current modulation unit according to the output signal having the first state, or injecting the synthesized signal to the switch-mode LED driver according to the output signal having the second state.

4. The visible light communication device of claim 2, wherein the path selection circuit further comprises a decision circuit, the decision circuit is a counter, and the counter receives at least one synthesized signal in a time period, counts a number of the at least one synthesized signal being in a high state and a number of the at least one synthesized signal being in a low state, obtains the data frequency according to a predefined clock frequency and the number of the at least one synthesized signal being in the high state, and obtains the dimming ratio according to the predefined clock frequency, the number of the at least one synthesized signal being in the high state and the number of the at least one synthesized signal being in the low state.

5. The visible light communication device of claim 1, wherein the one or more path selection information is the data frequency and the dimming ratio received by the path selection circuit, and the data frequency is obtained from the data signal and the dimming ratio is obtained from the dimming signal.

6. The visible light communication device of claim 5, wherein the path selection circuit comprises:

a decision circuit, receiving the data frequency and the dimming ratio, and generating an output signal having a first state when the data frequency is greater than a critical frequency or the data frequency is lower than or equal to the critical frequency and the dimming ratio is not in an interval between two different percentages or generating the output signal having a second state when the data frequency is lower than or equal to the critical frequency and the dimming ratio is in the interval between the two different percentages; and a driving circuit, receiving the output signal and the synthesized signal, and turning on the bypass current modulation unit to inject the synthesized signal to the bypass current modulation unit according to the output signal having the first state or inject the synthesized signal to the switch-mode LED driver according to the output signal having the second state.

7. The visible light communication device of claim 1, wherein the bypass current modulation unit is a multi-level current amplitude modulation circuit, and the multi-level current amplitude modulation circuit comprises:

at least a combination of a group consisting of a plurality of switches and a plurality of constant current sources, and the multi-level current amplitude modulation circuit controls the plurality of switches according to the synthesized signal for displaying the data signal.

8. The visible light communication device of claim 1, wherein the switch-mode LED driver generates a pulse width modulation (PWM) signal having a modulated duty cycle according to the synthesized signal for displaying the data signal.

9. A driving method for driving a visible light communication device, comprising:

synthesizing a data signal and a dimming signal in the visible light communication device to form a synthesized signal; and selecting to inject the synthesized signal along one path to a bypass current modulation unit or along another path to a switch-mode light-emitting diode (LED) driver of the visible light communication device according to a data frequency and a dimming ratio obtained from one or more path selection information, wherein the bypass current modulation unit or the switch-mode LED driver controls a light-emitting unit of the visible light communication device according to the synthesized signal for displaying the data signal, wherein the driving method further comprises:

performing a data frequency determining step comprising determining whether the data frequency is lower than or equal to a critical frequency or not, if not, turning on a bypass current modulation unit to inject the synthesized signal to the bypass current modulation unit and the bypass current modulation unit controls a light-emitting unit according to the synthesized signal for displaying the data signal, if yes, further performing a dimming ratio determining step; and in the dimming ratio determining step, determining whether the dimming ratio is in an interval between two different percentages or not, if not, turning on the bypass current modulation unit to inject the synthesized signal to the bypass current modulation unit along one path, wherein the bypass current modulation unit controls the light-emitting unit according to the synthesized signal for displaying the data signal, if yes, injecting the synthesized signal to a switch-mode LED driver along another path, wherein the switch-mode LED driver controls the light-emitting unit according to the synthesized signal for displaying the data signal.

10. The driving method for driving the visible light communication device of claim 9, wherein the one or more path selection information is the synthesized signal, and the data frequency and the dimming ratio are obtained from the synthesized signal.

11. The driving method for driving the visible light communication device of claim 10, further comprising:

calculating the data frequency and the dimming ratio from the synthesized signal, and generating an output signal having a first state when the data frequency is greater than a critical frequency or the data frequency is lower than or equal to the critical frequency and the dimming ratio is not in an interval between two different percentages or generating the output signal having a second state when the data frequency is lower than or equal to the critical frequency and the dimming ratio is in the interval between the two different percentages; and turning on the bypass current modulation unit to inject the synthesized signal to the bypass current modulation unit along one path according to the output signal having the first state or injecting the synthesized signal to the switch-mode LED driver along another path according to the output signal having the second state.

12. The driving method for driving the visible light communication device of claim 10, further comprising:

counting a number of the synthesized signal being in a high state and a number of the synthesized signal being in a low state in a time period, obtaining the data frequency according to a predefined clock frequency and the number of the synthesized signal being in the high state, and obtaining the dimming ratio according to the predefined clock frequency, the number of the synthesized signal being in the high state and the number of the synthesized signal being in the low state.

13. The driving method for driving the visible light communication device of claim 10, wherein the one or more path selection information is the data frequency and the dimming ratio received by the path selection circuit, and the data frequency is obtained from the data signal and the dimming ratio is obtained from the dimming signal.

14. The driving method for driving the visible light communication of claim 13, further comprising:

generating an output signal having a first state when the data frequency is greater than a critical frequency or the data frequency is lower than or equal to the critical frequency and the dimming ratio is not in the interval between the two different percentages or generating the output signal having a second state when the data frequency is lower than or equal to the critical frequency and the dimming ratio is in the interval between the two different percentages; and turning on the bypass current modulation unit to inject the synthesized signal to the bypass current modulation unit alone one path according to the output signal having the first state, or inject the synthesized signal to the switch-mode LED driver along another path according to the output signal having the second state.

15. A visible light communication device, comprising:
a light-emitting unit;
a switch-mode light-emitting diode (LED) driver, providing a driving current for driving the light-emitting unit;
a synthesizing circuit, synthesizing a data signal and a dimming signal to form a synthesized signal; and a path selection circuit, according to a data frequency and a dimming ratio obtained from one or more path selection information, selecting to turn on a bypass current modulation unit to inject the synthesized signal to the bypass current modulation unit along one path, wherein the bypass current modulation unit controls the light-emitting unit for displaying the data signal according to the synthesized signal, or selecting to inject the synthesized signal to the switch-mode LED driver along another path, wherein the switch-mode LED driver controls the light-emitting unit according to the synthesized signal for displaying the data signal, wherein the one or more path selection information is the synthesized signal, and the data frequency and the dimming ratio are obtained from the synthesized signal;

wherein the path selection circuit comprises:

a decision circuit, receiving the synthesized signal, calculating the data frequency and the dimming ratio from the synthesized signal, and generating an output signal having a first state when the data frequency is greater than a critical frequency or the data frequency is lower than or equal to the critical frequency and the dimming ratio is not in an interval between two different percentages or generating the output signal having a second state when the data frequency is lower than or equal to the critical frequency and the dimming ratio is in the interval between the two different percentages; and a driving circuit, receiving the output signal and the synthesized signal, and turning on the bypass current modulation unit to inject the synthesized signal to the bypass current modulation unit according to the output signal having the first state, or injecting the synthesized signal to the switch-mode LED driver according to the output signal having the second state.

* * * * *